United States Patent
Kimura et al.

(10) Patent No.: US 7,821,174 B2
(45) Date of Patent: Oct. 26, 2010

(54) ARMATURE OF ROTATING ELECTRIC MACHINE AND METHOD OF MANUFACTURING THE SAME

(75) Inventors: Masaaki Kimura, Isesaki (JP); Tsugio Yokoo, Isesaki (JP); Keiichi Hosoi, Isesaki (JP); Toshikazu Terada, Ota (JP); Yoichi Yamazaki, Sano (JP)

(73) Assignee: Mitsuba Corporation, Kiryu-shi (JP)

( * ) Notice: Subject to any disclaimer, the term of this patent is extended or adjusted under 35 U.S.C. 154(b) by 210 days.

(21) Appl. No.: 11/921,552

(22) PCT Filed: Jun. 5, 2006

(86) PCT No.: PCT/JP2006/311199

§ 371 (c)(1),
(2), (4) Date: Dec. 5, 2007

(87) PCT Pub. No.: WO2006/132171

PCT Pub. Date: Dec. 14, 2006

(65) Prior Publication Data

US 2009/0115281 A1    May 7, 2009

(30) Foreign Application Priority Data

Jun. 7, 2005    (JP) ............................. 2005-166349

(51) Int. Cl.
*H02K 1/00* (2006.01)
(52) U.S. Cl. ................................. 310/216.004; 29/596
(58) Field of Classification Search .................. 29/596; 310/216.001–216.137
See application file for complete search history.

(56) References Cited

U.S. PATENT DOCUMENTS 4,894,905 A * 1/1990 Tanaka et al. ................. 29/598
2004/0164837 A1 * 8/2004 Fujita ......................... 336/234

FOREIGN PATENT DOCUMENTS

| JP | B2-60-056057 | 12/1985 |
| JP | U-03-060854 | 6/1991 |
| JP | A-05-211736 | 8/1993 |
| JP | A-05-252678 | 9/1993 |
| JP | A-2003-111326 | 4/2003 |

* cited by examiner

*Primary Examiner*—Hanh N. Nguyen
(74) *Attorney, Agent, or Firm*—Oliff & Berridge, PLC (57) ABSTRACT

A rotating electric machine includes a shaft and an armature with a core that includes a shaft hole. The core includes a plurality of core materials that are laminated. When pressing in and fixing the shaft to the shaft hole, the shaft hole is applied with an ironing process in advance in order to rectify a cylindrical hole shape of the shaft hole.

20 Claims, 7 Drawing Sheets

ARMATURE OF ROTATING ELECTRIC MACHINE AND METHOD OF MANUFACTURING THE SAME

CROSS-REFERENCE TO RELATED APPLICATION

This application is the U.S. National Stage of PCT/JP2006/311199, filed Jun. 5, 2006, which claims priority from JP2005-166349, filed Jun. 7, 2005, the entire disclosures of which are incorporated herein by reference hereto.

BACKGROUND

The present disclosure relates to an armature.

There exists rotating electric machines that include an armature that is formed with a core that is wound around by a coil and fitted by a shaft so as to be supported. The core is constructed by laminating, via integration, a plurality of ring-shaped plate materials that are each formed by punching a metallic plate material. The shaft is pressed into a shaft hole formed in the core so as to fix the shaft to the core. For the rotating electric machines, it is necessary to fix the shaft (to reach a strongly integrated state) to the core in a state where relative movement in the axial direction and in the direction around the axis is restricted (an integrating, fixing, and fastening state).

In order to achieve a strongly integrated state between the shaft and the core, an outside diameter of the shaft has been set to be larger than an inside diameter of the shaft hole so as to press the shaft into the shaft hole. Such a construction, however, has disadvantages. Not only is the press-in work difficult, but deformation also occurs in the core due to a press-in load that distorts the shape of the shaft hole. Shaft core accuracy of the shaft is thus impaired, and a crack also occurs in the core so as to deteriorate durability.

In order to resolve those problems, a proposed armature is constructed by forming projections (knurls) on an outer circumferential surface of a shaft and press-fitting so that the projections are caught in the inner circumferential surface of a shaft hole. This construction attempts to reach a state (a fastening state) that prevents rotation with respect to the shaft hole and restricts movement in an axial direction (see Japanese Published Unexamined Patent Application No. 2003-111326, for example).

SUMMARY

The above proposed armature has problems because an inside diameter of the shaft hole has been set slightly larger than an outside diameter of the shaft and a slight clearance exists therebetween. It is not only difficult securing coaxial shaft core accuracy between the shaft and shaft hole without spoiling the rotation balance, but it is also difficult maintaining a side surface of the core and the shaft in an orthogonal relationship in order to avoid a wobbling surface at the time of a rotary drive. In order to improve shaft core accuracy of the armature, accordingly, the projections have not been provided on the outer circumferential surface of the shaft.

On the other hand, because the core is constructed by laminating a plurality of core materials, a lamination misalignment inevitably occurs and another misalignment also occurs in the shaft hole. As a result, a cylindrical hole inner circumference of the shaft hole is stepped, and shaft core accuracy of the cylindrical hole is degraded. When a shaft without projections is pressed into such a core so as to construct an armature, rotation balance is inferior and a surface shake occurs because the lamination misalignment directly affects shaft core accuracy of the shaft. In addition, a sufficient contact area may not be secured between the shaft and the shaft hole. A fastening force between the core and the shaft thus becomes insufficient. The present disclosure solves those problems as well as other problems and is also able to achieve various advantages.

The disclosure addresses an exemplary aspect of a rotating electric machine that includes a shaft and an armature with a core that includes a shaft hole. The core includes a plurality of core materials that are laminated. When pressing in and fixing the shaft to the shaft hole, the shaft hole is applied with an ironing process in advance in order to rectify a cylindrical hole shape of the shaft hole.

In another exemplary aspect, a part of the shaft, whose outer circumferential surface is fitted with the shaft hole, is formed in a perfect circular shape.

In another exemplary aspect, the core includes a space passing therethrough in an axial direction at an inner radial-side part of the core that defines the shaft hole with the space located at an inner radial side further than a location where the core materials are integrated.

In another exemplary aspect, the core materials are formed by a punching process of metallic plate materials, and the ironing process is performed in a same direction as a punching direction of the punching process.

In another exemplary aspect, a manufacturing method of an armature includes forming a core that includes a shaft hole by laminating a plurality of core materials and applying an ironing process to the shaft hole in order to rectify a cylindrical hole shape of the shaft hole.

According to various exemplary aspects of the disclosure, even if a lamination misalignment has occurred in a shaft hole of a core for which a plurality of core materials are laminated, the lamination misalignment is eliminated, and the cylindrical hole shape is rectified. A shaft hole that is excellent in shaft core accuracy of the cylindrical hole can be achieved, whereby an armature excellent in rotation balance can be provided.

According to various exemplary aspects of the disclosure, the core can be constructed by integration without being impaired.

According to various exemplary aspects of the disclosure, an ironing process can be smoothly performed.

According to various exemplary aspects of the disclosure, the cylindrical hole shape of the shaft hole can be rectified with high accuracy.

BRIEF DESCRIPTION OF THE DRAWINGS

Various embodiments of the disclosure will be described with reference to the drawings, wherein:

FIG. 5A is a side view, FIG. 5B is a sectional view along A-A, and FIG. 5C is a partially enlarged sectional view for explaining an ironing process;

DETAILED DESCRIPTION OF EMBODIMENTS

Next, embodiments of the present disclosure will be described based on the drawings. In FIGS. 1A, 1B, 5A, 5B, and 6, reference numeral 1 denotes a motor shaft (shaft) of an electric motor (of a rotating electric machine) that functions as a fan motor. The motor shaft 1 is in a columnar shape. A step portion 1a, which is a fan attaching portion, is formed at a first end of the motor shaft 1 (see FIGS. 1A and 5A). The motor shaft 1 is set so as to construct an armature by, as will be described later, fitting a commutator 3 with an outer circumference of the motor shaft 1 at a second end (other half portion) of the motor shaft 1, fitting a core 2 with an outer periphery of the motor shaft 1 at the first end (one half portion) of the motor shaft 1, and winding a coil (not unillustrated) around the core 2 (see FIG. 1A).

The motor shaft 1 includes a plurality of (eight) projections (knurls) that are long in an axial direction and are formed on an outer circumferential surface of the other half portion. The motor shaft 1 is set so as to reach a fastening state, where movement in an axial direction and a direction around the axis of the commutator 3 is restricted, when a resin portion on an inner radial side of the commutator 3 is fitted on the motor shaft 1 so as to be caught in the projections 1b.

In addition, the outer circumferential surface of the one half portion of the motor shaft 1 with which the core 2 is fitted has no projections formed thereon. The one half portion of the motor shaft 1 is thus formed so that a section at that part has a perfect circular shape. A length of the motor shaft 1, at a part externally fitted with the core 2, is set to be slightly longer than a shaft hole (through-hole) 2a that is open in the core 2, which is described later.

Figure 1A:
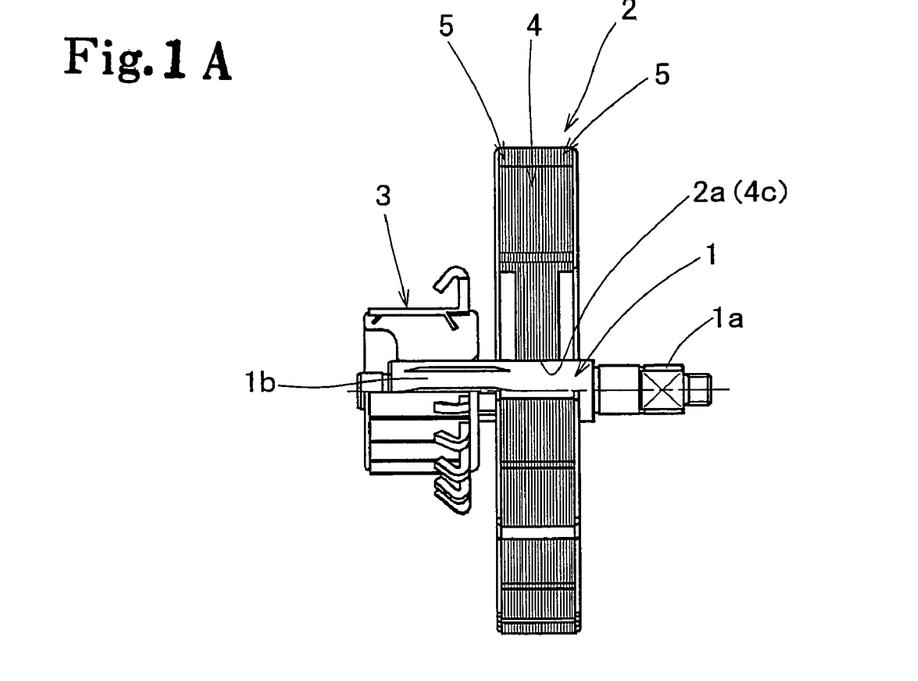
FIG. 1A is a side view and FIG. 1B is a front view of an armature core.
Figure 1B:
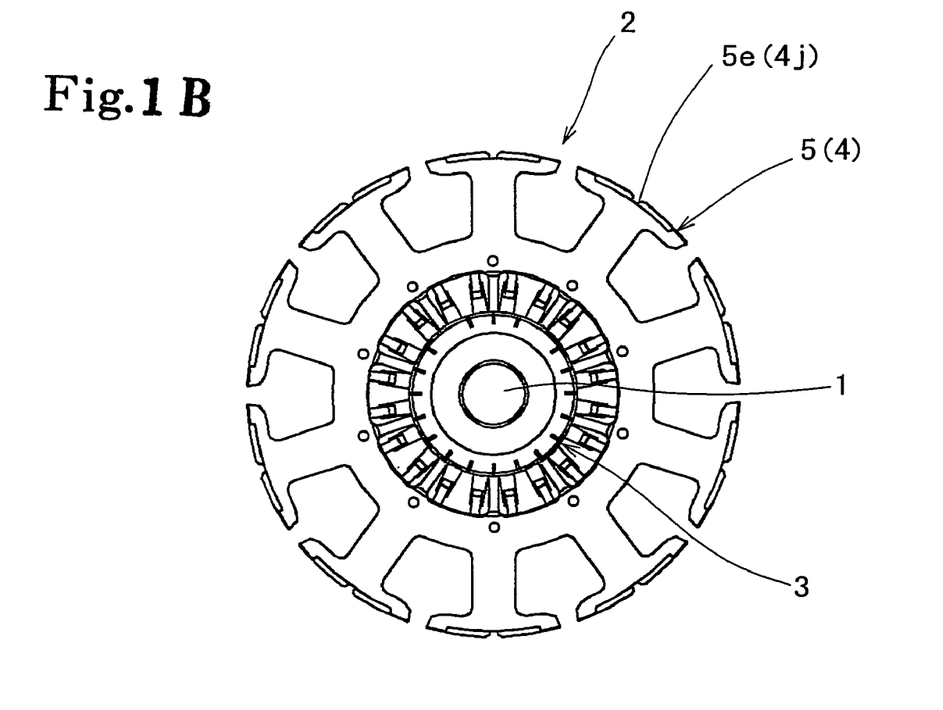
Figure 2:
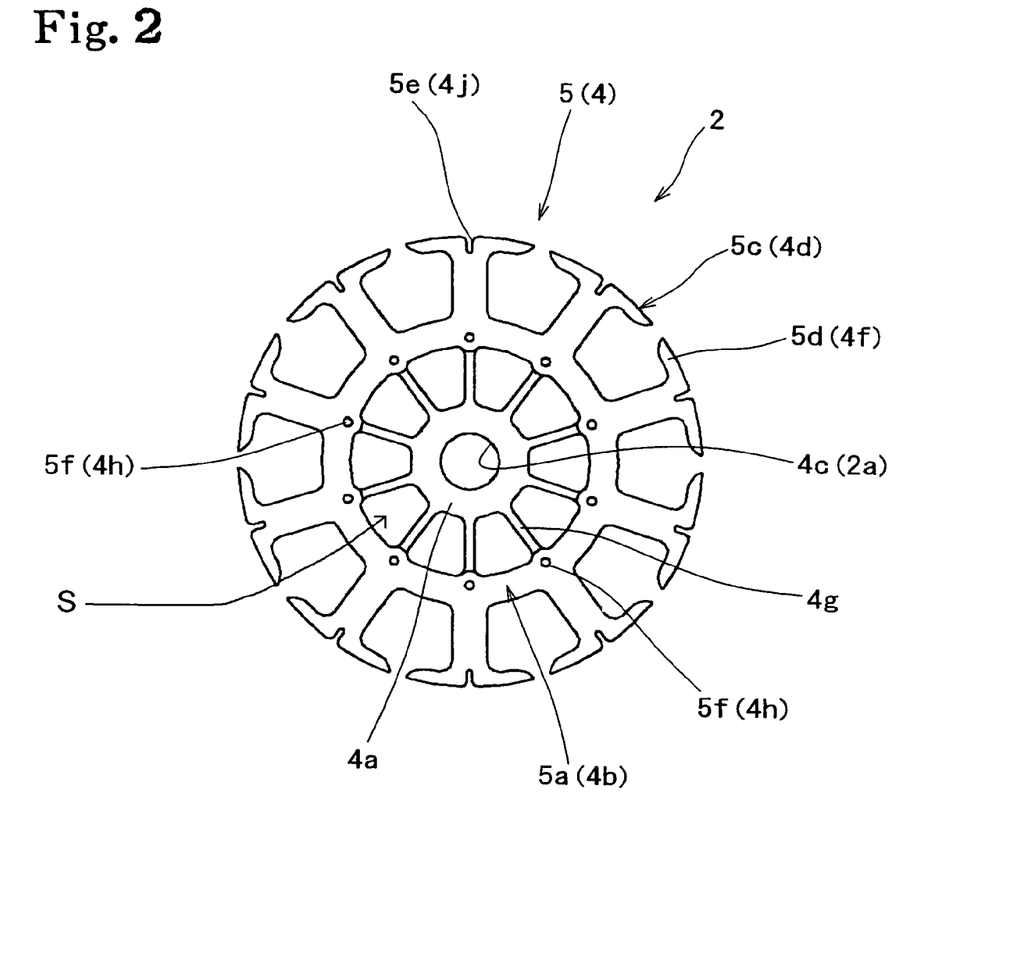
FIG. 2 is a front view of a core.

The core 2 is constructed by integrally laminating a plurality of main core materials 4 that are disposed in an axial center portion of the motor shaft 1 and a plurality of sub-core materials 5 that are disposed on both axial side portions of the main core materials 4 (see FIGS. 1B and 2). The main core material 4 is formed by a punching process of a flat circular-shaped metal material. The main core material 4 is constructed with an inner radial-side ring portion 4a, which is an inner radial-side part, and an outer radial-side ring portion 4b, which is an outer radial-side part (see FIGS. 2, 3A, 3B).

Figure 3A:
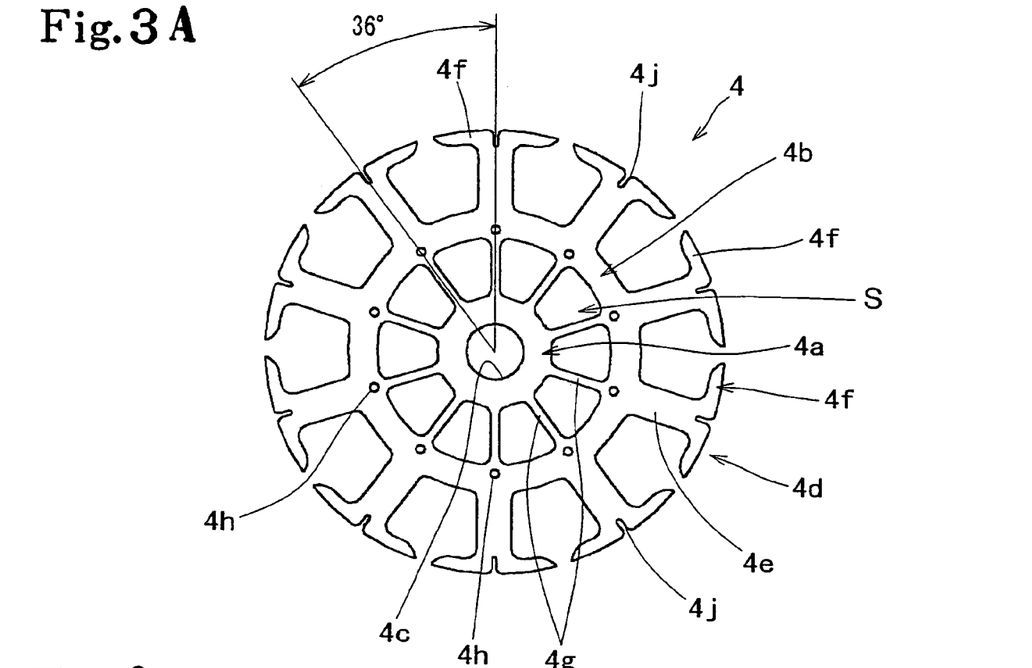
FIG. 3A is a front view and FIG. 3B is a partially enlarged front view of a main core material.
Figure 3B:
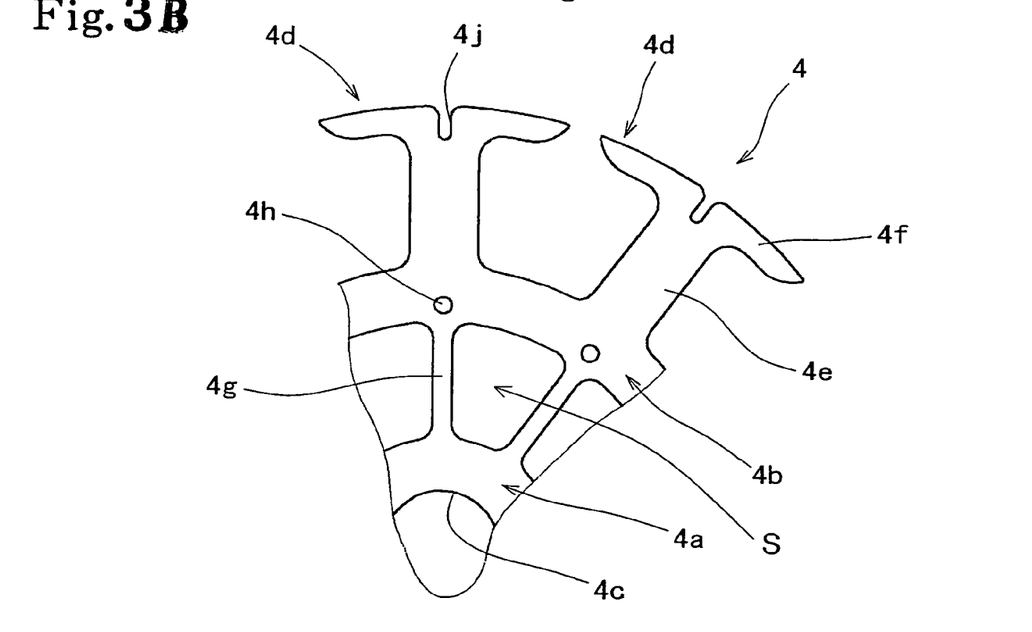

At the center of the inner radial-side ring portion 4a, open is a through-hole 4c to pass the motor shaft 1 therethrough (see FIGS. 2, 3A, 3B). On the outer radial-side ring portion 4b, formed in the circumferential direction are a plurality of teeth 4d protruding radially with reference to the center of the through-hole 4c (see FIGS. 3A and 3B). Each tooth 4d is constructed with a base portion 4e that radially protrudes from an outer peripheral portion of the outer radial-side ring portion 4b and a claw portion 4f that is extended from an outer radial-side front-end portion of the base portion 4e toward both circumferential sides (also see FIGS. 3A and 3B). In the present embodiment, around the main core material 4, formed are ten teeth 4d, for example, at equal intervals in the circumferential direction at an angle of 36 degrees (see FIG. 3A).

Further for the main core material 4, formed are a plurality of bridge piece portions 4g that connect the inner radial-side ring portion 4a and the outer radial-side ring portion 4b (see FIGS. 2, 3A, and 3B). The bridge piece portions 4g are radially formed in the same manner as the teeth 4d with reference to the center of the through hole 4c. The bridge piece portions 4g are also formed in ten pieces, for example, all in the circumferential direction corresponding to radial reference lines of the respective teeth 4d forming parts.

Ten caulking portions 4h are formed in the circumferential direction on the outer radial-side ring portion 4b of the main core material 4 at the same angular intervals as the angular intervals between the teeth 4d that are adjacent in the circumferential direction. That is, in a manner located at parts along the radial reference lines of the teeth 4d forming parts (see FIGS. 2, 3A, 3B).

In addition, at an outer peripheral portion, on an outer radial-side front edge portion of the claw portion 4f of each tooth 4d, formed is a notched recess portion 4j notched toward the inner radial side while being located at a circumferential middle portion. A reduction in weight of the core 2 is thus realized (see FIGS. 2, 3A, 3B).

The sub-core material 5 is formed by a punching process of a metallic plate material, which is the same as the main core material 4. The sub-core material 5 is also constructed with a ring portion 5a that has almost the same shape as the outer radial-side ring portion 4b of the main core material 4.

Figure 4A:
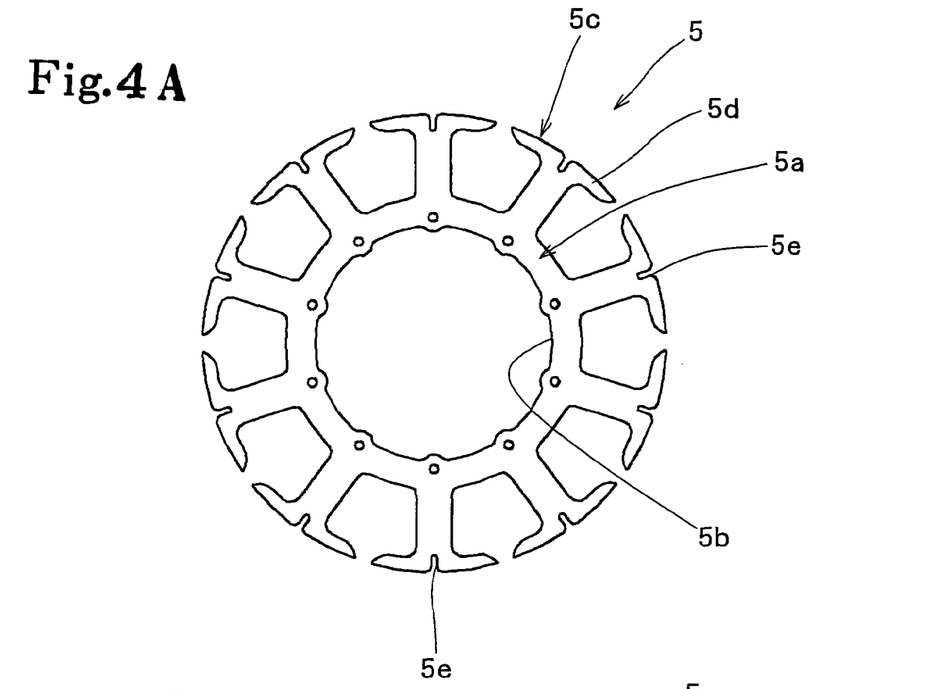
FIG. 4A is a front view and FIG. 4B is a partially enlarged front view of a sub-core material.
Figure 4B:
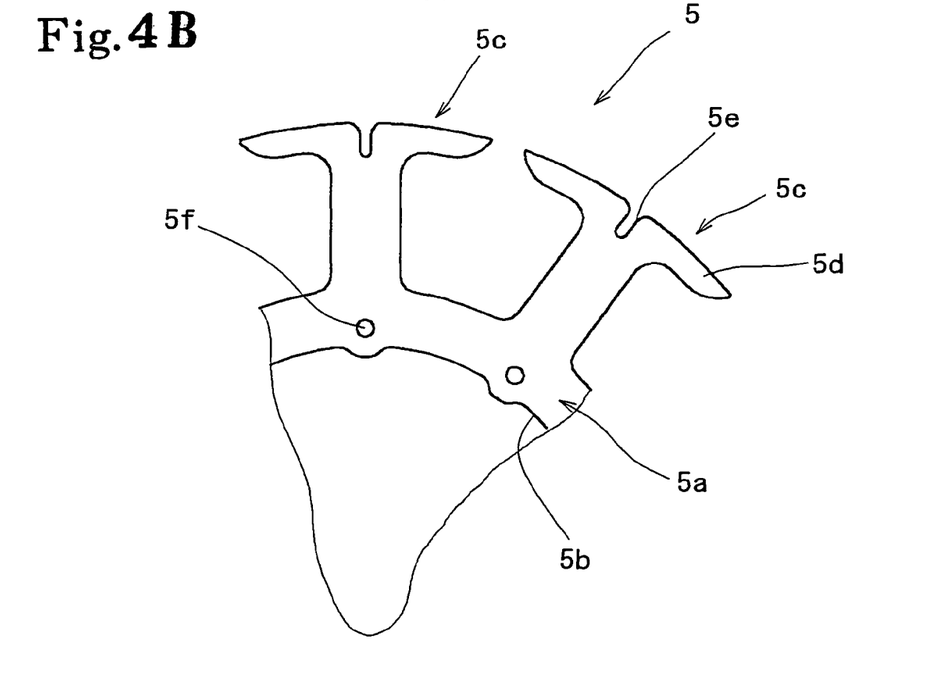

An inside diameter at an inner periphery 5b of the ring portion 5a of the sub-core material 5 is set at approximately the same inside diameter as the outer radial-side ring portion 4b of the main core material 4 (see FIGS. 4A and 4B). The sub-core material 5 is in a shape without any additional structure formed inside the inner periphery 5b of the sub-core material 5 (a shape without bridge piece portions and an inner radial-side ring portion). Moreover, ten circumferential teeth 5c are formed on the ring portion 5a of the sub-core material 5. Notched recess portions 5e are formed at the claw portions 5d in the same shape as that of the notched recess portions 4j of the main core material 4 (see FIGS. 4A and 4B). A reduction in weight of the core 2 is thus realized.

Ten caulking portions 5f are formed in the circumferential direction on the ring portion 5a of the sub-core material 5, at the same angular intervals as the angle intervals between the teeth 5c that are adjacent in the circumferential direction. That is, in a manner located at parts along the radial reference lines of the teeth 5c forming parts.

With the main and sub-core materials 4 and 5 constructed as such, the core 2 is integrally formed such that a plurality of the sub-core materials 5 are laminated on both side portions of a plurality of laminated main core materials 4. In the present embodiment, furthermore, the caulking portions 4h and 5f are formed for integrating the main materials 4 and the sub-core materials 5. The caulking portions 4h and 5f are constructed by embossing either one of the surfaces of the main core materials 4 and the sub-core materials 5 toward the other surface in order to form concave portions on the surface and bosses on the other surface. The adjacent main core materials 4 and sub-cores materials 5 are set so as to be fitted together, by fitting the concave portions of these caulking portions 4h and 5f with the bosses of their adjacent caulking portions 4h and 5f, with their respective teeth 4d and 5c aligned, and integrated by so-called boss caulking to caulk up the bosses in this fitted state. The core 2 is thus constructed.

In the core 2 constructed by integrating a plurality of the main and sub-core materials 4 and 5 as such, formed is a shaft hole 2a that is constructed by the through-hole 4c that is open in the inner radial-side ring portion 4a of the main core material 4. Because the shaft hole 2a is formed by laminating a plurality of main core materials 4, each core material 4 has a slight displacement (lamination misalignment) in the radial direction in the integrated state of the main core materials 4. Even if each main core material 4 has been enhanced in order to improve the circularity of the through-hole 4c, shaft core accuracy of the shaft hole 2a is not obtained because the cylindrical hole shape of the shaft hole 2a has not been rectified. In the present disclosure, however, because an ironing process is executed after a step of forming the core 2, but before a step of passing and fixing the motor shaft 1 therethrough, the shaft hole 2a is rectified so as to become a cylindrical hole without steps that are created because of displacement of the main core materials 4. Excellent shaft core accuracy can thus be achieved.

Figure 6:
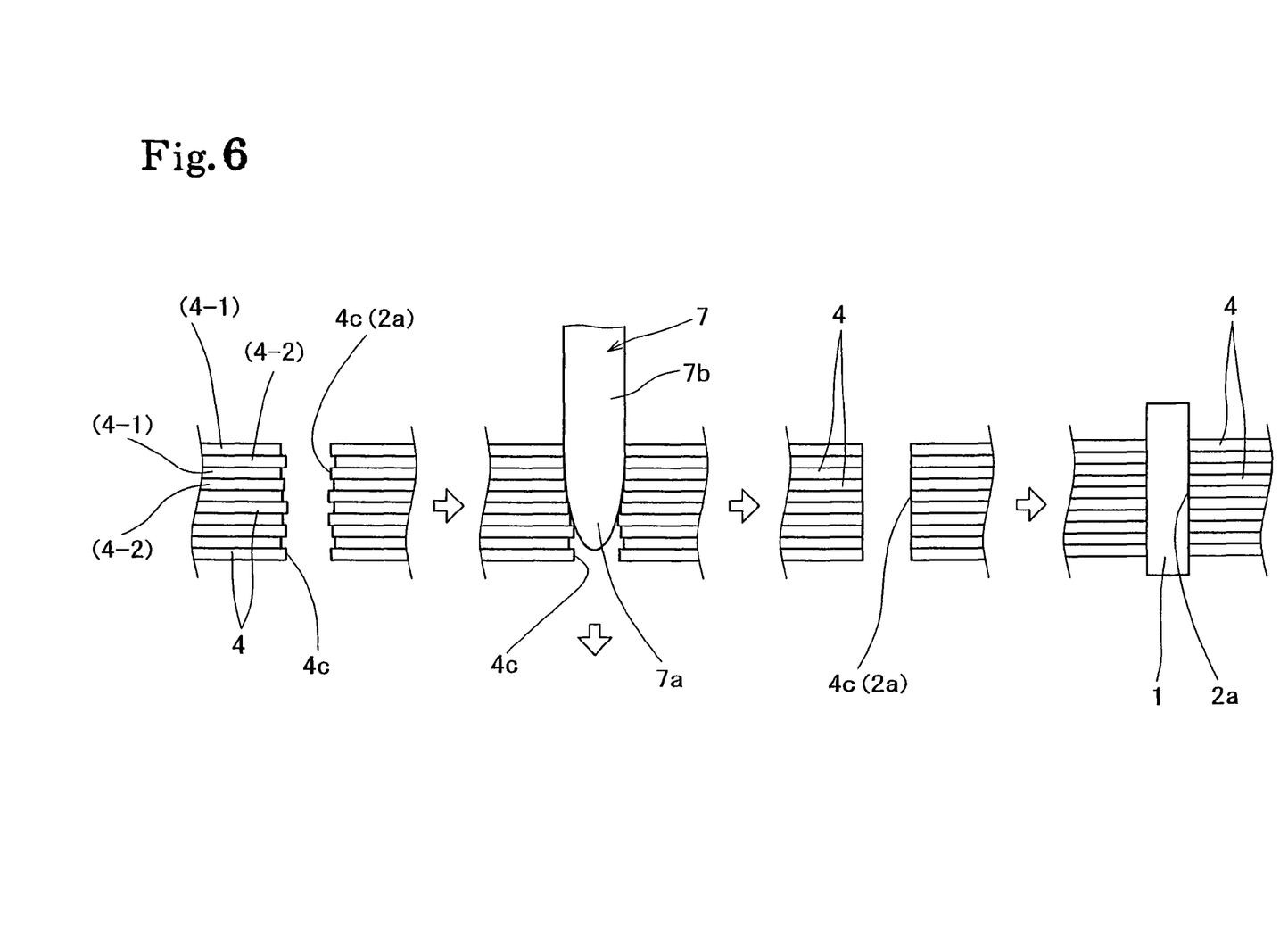
FIG. 6 is a pattern view for explaining steps from an ironing process to press-in of a motor shaft.

As illustrated in FIG. 6, when the main materials 4 and the sub-core materials 5 have been laminated and integrated by performing boss caulking of the caulking portions 4h and 5f, the shaft hole 2a is in a state where the respective types of core materials 4 (for example, materials 4-1 and 4-2) are displaced in the radial direction. Subsequently an ironing process is applied to the shaft hole 2a. An ironing punch 7 (for the ironing process) has a front end to be inserted through the shaft hole 2a. The front end of the ironing punch 7 is a tapered portion 7a that has a diameter that decreases toward a front end of the ironing punch 7. An insertion through the shaft hole 2a is thus smoothly performed. Here, an outside diameter of the ironing punch 7 at a base end side (at a body portion 7b) is set to be slightly larger than an inside diameter of the through-hole 4c that is open in the main core material 4.

The ironing punch 7, as shown in FIG. 6, is pushed by force and inserted from the tapered portion 7a into the shaft hole 2a of the core 2 (that includes a lamination misalignment) until the body portion 7b of the ironing punch 7 passes through the shaft hole 2a. The displacement of the shaft hole 2a is thus eliminated after the body portion 7b passes through the shaft hole 2a. The shaft hole 2a that is excellent in circularity is thus achieved.

Here, when the ironing punch 7 is forcibly pushed in the shaft hole 2a, the inner radial-side ring portion 4a of the main core material 4 corrects the displacement of the shaft hole 2a. Between the inner radial-side ring portion 4a and the outer radial-side ring portion 4b, provided are the bridge piece portions 4g with predetermined gaps in the circumferential direction. A plurality of (ten) space portions S (which is an example of spaces) are formed at an outer radial side of the inner radial-side ring portion 4a (see FIGS. 2, 3A, and 3B). The space portions S thus function as a buffer that absorbs deformation of the inner radial-side ring portion 4a, which allows for smooth execution of corrective insertion of the ironing punch 7 into the shaft hole 2a.

Figure 5:
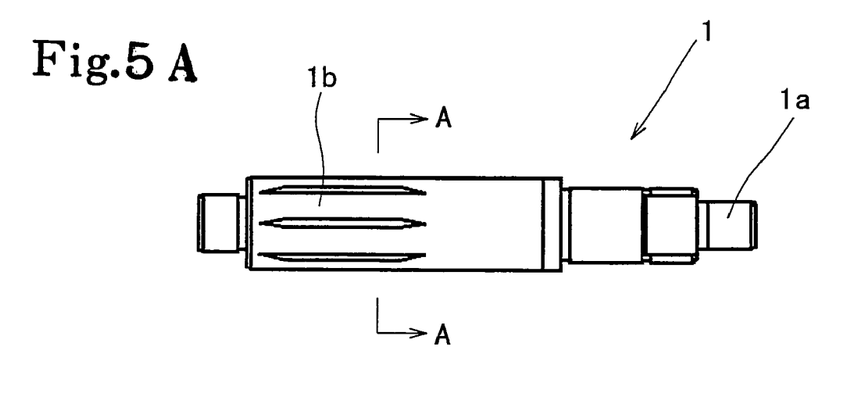

Each core material 4 and 5 is formed by a punching process (pressing) of a metallic plate material. As shown in FIG. 5C, as a cut portion that is applied with the punching process as such, the through-hole 4c part of the main core material 4 is formed in a shear plane 4m that is inclined from a front side toward a rear side in the punching direction up to approximately an intermediate part in terms of the plate thickness. Formed in a part of the rear side in the punching direction is a fracture surface 4n that is drooped toward the rear side. A burr 4p is also formed so as to protruded from a plate surface of the core material 4 to the rear side of the punching direction. In addition, when a punching process is applied, the cut portion is residually stressed.

Meanwhile, with an ironing process by the ironing punch 7 of the present disclosure being applied to the above-mentioned cut portion, the shear plane 4m can be corrected so as to lie along the inserting direction of the ironing punch 7, and thus is shaped so as to reach a state orthogonal to the plate material. In addition, because the ironing punch 7 is constructed so as to be forcibly pushed in a so-called droop direction from the shear plane 4m side toward the burr 4p forming part, orthogonal accuracy of the shaft hole 2a with respect to the plate material can be enhanced. In this connection, if the ironing punch 7 is pushed in from the direction opposite the droop direction, that is, a push-in from the fracture surface 4n side, not only are rectifying properties of the shaft hole 2a lowered, but also the ironing punch 7 may drag in the burr 4p. This is not preferable.

By pressing the motor shaft 1 without knurls on its outer circumferential surface in the shaft 2a and fixing the motor shaft 1 to the cut part that is applied with an preferable ironing process as such, the motor shaft 1 and the core 2 are integrated. Since orthogonality of the shaft hole 2a has been maintained, orthogonality of the motor shaft 1 with a plate surface of the core 2 is enhanced. A surface shake of the core 2 at the time of rotation of the motor shaft 1 is thus reduced.

In addition, a contact area between the shear plane 4m in the through-hole 4c of each main core material 4 and an outer circumferential surface of the motor shaft 1 has been large, so that a degree of press-fitting (degree of adhesion) therebetween is increased, and a large fastening force can be secured.

By forcibly pushing the ironing punch 7 that is larger in diameter than the hole form of the through-holes 4c, individually different residual stresses respectively generated in the through-holes 4c become a residual stress corresponding to the shaft hole 2a of the core 2 that is constructed by integrating the respective core materials 4 and 5. This is a homogenized stress of residual stresses generated in these core materials 4, so that a fastening force between the core 2 and the motor shaft 1 can be strengthened.

Because the diameter of the ironing punch 7 is relatively increased with respect to the shaft hole 2a and forcibly pushed in the droop direction, the shear plane 4m can be made in an orthogonal form with respect to the plate materials. In addition, the orthogonal form can be widened in area, so that a fastening force can be further greatly secured.

In the present embodiment constructed as described, for the electric motor, as power is supplied, the armature (that is constructed by winding a coil around the core 2) rotates integrally with the motor shaft 1. The ironing process has been applied such that the ironing punch 7 is forcibly pushed into the shaft hole 2a that is formed in the core 2 for which a plurality of main core materials 4 and a plurality of sub-core materials 5 have been laminated and integrated. A lamination misalignment that has formed in the shaft hole 2a due to the lamination of the plurality of core materials 4 and 5 is thus eliminated. A rectified cylindrical hole shape can be provided without a step formed by every single plate thickness of the core material 4 and 5.

Moreover, because the shaft hole 2a can be made in an orthogonal form with respect to the plate surfaces of the core material 4 and 5, shaft core accuracy of the cylindrical hole can be improved. An armature excellent in balance without a surface shake at the time of rotation of the armature thus can be provided.

Furthermore, since the motor shaft 1 has a perfect circular sectional shape without knurls at a part externally fitted with the core 2, when the motor shaft 1 is pressed in and fixed to the shaft hole 2a that has been rectified to obtain shaft core accuracy of a cylindrical hole, an armature excellent in rotation balance can be provided. An electric motor excellent in performance thus can be provided.

In addition, since the inner radial-side ring portion 4a of the main core material 4 that comprises an inner radial-side part of the core 2 and the outer radial-side ring portion 4b that comprises an outer radial-side part are connected by the bridge piece portions 4g that are disposed with predetermined gaps in the circumferential direction, the space portions S are formed between the inner radial-side ring portion 4a and the outer radial-side ring portion 4b. The space portions S can actively absorb a load generated while the ironing punch 7 is being pushed into the shaft hole 2a of the core 2, so that an ironing process of the shaft hole 2a can be smoothly and reliably performed.

Moreover, since the space portions S are located at an inner radial side further than integrating parts (fixing portions) of the caulking portions 4h and 5f that integrate the main and sub-core materials 4 and 5 (i.e., at an inner radial side further than a location where the main and sub-core materials 4 and 5 are integrated), the space portions S at the inner radial side absorb deformation of an outer circumference of the shaft hole 2a due to a forcible push-in of the ironing punch 7. A load onto the integrating parts (caulking portions 4h and 5f) of the main and sub-core materials 4 and 5 at an outer radial side further than the space portions S can be reduced. Advantageously, an ironing process also can be performed without impairing integration of the main and sub-core materials 4 and 5.

Although the respective core materials 4 and 5 individually have residual stresses generated by a punching process, when the motor shaft 1 is pressed, a degree of adhesion to the motor shaft 1 can be increased because the residual stresses are homogenized to ones in the same direction by an ironing process of the shaft hole 2a. A fastening force between the motor shaft 1 and the core 2 is thus further strengthened. Moreover, since a direction of an ironing process (direction to push in the ironing punch 7) is set to a droop direction of the punching process, the ironing punch 7 is pushed in from the shear plane 4m side, so that a degree of circularity of the shaft hole 2a and a degree of orthogonality of the shaft hole 2a with respect to the plate materials can be improved.

As a matter of course, the present disclosure is not limited to the aforementioned embodiment. The present disclosure can be carried out in a second embodiment shown in FIG. 7. The second embodiment is the same as the aforementioned embodiment in that a core 8 is constructed, with use of main and sub-core materials 9 and 10, by laminating a plurality of sub-core materials 10 on both sides of a plurality of main core materials 9, respectively. The main core material 9 includes an inner radial-side ring portion 9a; an outer radial-side ring portion 9b; and ten circumferential bridge piece portions 9c that connects the inner radial-side ring portion 9a and the outer radial-side ring portion 9b together. The sub-core material 10 includes a ring portion 10a. Ten circumferential teeth 9d and 10b are formed around each core material 9 and 10.

Figure 7:
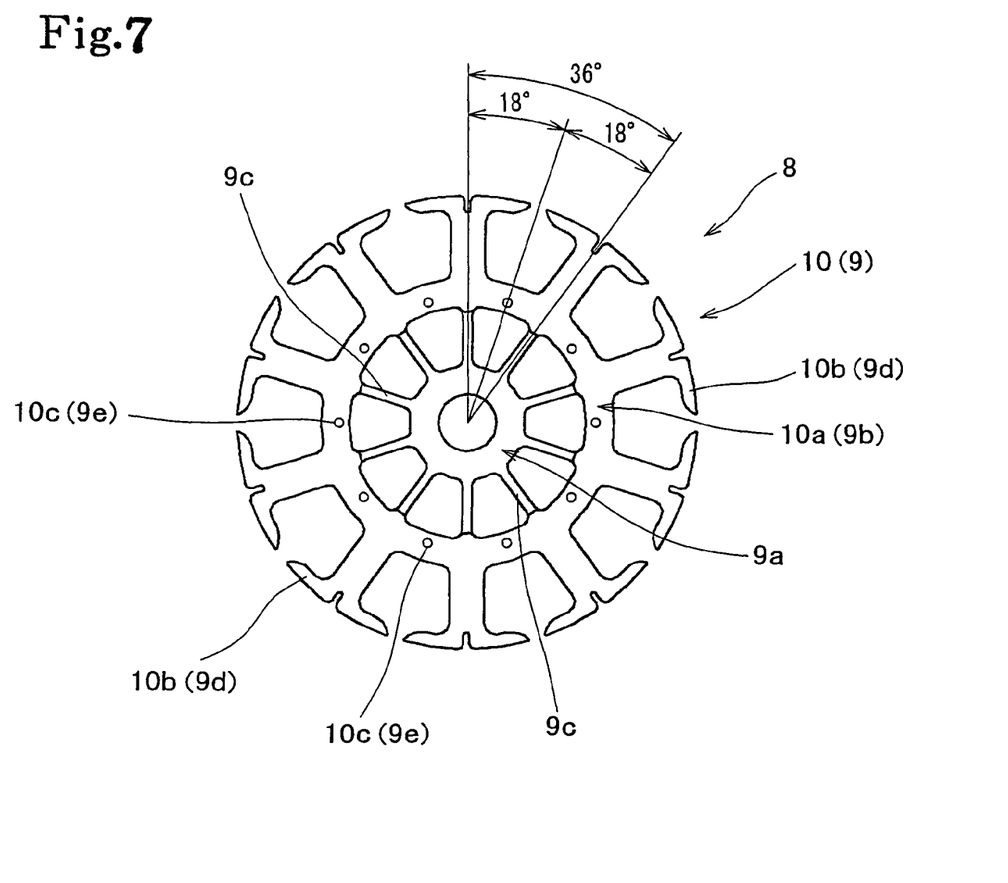
FIG. 7 is a front view of a core in a second embodiment.

Caulking portions 9e and 10c that integrate each core material 9 and 10 are formed so as to be located at an outer radial side of the bridge piece portions 9c. In other words, these caulking portions 9e and 10c are formed in the outer radial ring portion 9b of the main core material 9 and the ring portion 10a of the sub-core material 10, at intermediate portions of the teeth 9d and 10b adjacent in a circumferential direction. That is, the caulking portions 9e and 10c are formed along radial reference lines between the bridge piece portions 9c adjacent in a circumferential direction. Consequently, the main and sub-core materials 9 and 10 are integrated by hinge pins that are displaced from the bridge piece portions 9c in the circumferential direction, and that are located outward of the space portions S formed between the adjacent bridge piece portions 9c. A load resulting from an ironing process that acts on the caulking portions 9e and 10c can further be reduced, so that an ironing process can be conducted without impairing integration of the respective core materials 9 and 10. An armature even more excellent in rotation balance can be thus provided.

The present disclosure is useful for an armature of a rotating electric machine such as a component of electric equipment to be mounted on a vehicle and a manufacturing method thereof. In an armature that is formed by fitting a shaft with a core around which a coil is wound so as to be supported, an ironing step is in advance applied to a shaft hole of the core for which a plurality of core materials are laminated in order to rectify a cylindrical hole. A lamination misalignment can thus be eliminated. A shaft hole excellent in shaft core accuracy of the cylindrical hole is also formed, whereby an armature excellent in rotation balance can be provided.

What is claimed is:

1. A rotating electric machine, comprising:
   a shaft; and
   an armature with a core that includes a shaft hole, wherein:
   the core includes a plurality of core materials that are laminated, the plurality of core materials forming the shaft hole, and
   when pressing in and fixing the shaft to the shaft hole, the shaft hole is applied with an ironing process in advance in order to rectify a cylindrical hole shape of the shaft hole such that the shaft hole is formed without steps and lamination misalignment in the lamination of the plurality of core materials is eliminated.

2. The rotating electric machine according to claim 1, wherein a part of the shaft, whose outer circumferential surface is fitted with the shaft hole, is formed in a perfect circular shape.

3. The rotating electric machine according to claim 2, wherein the core includes a space passing therethrough in an axial direction at an inner radial-side part of the core that defines the shaft hole with the space located at an inner radial side further than a location where the core materials are integrated.

4. The rotating electric machine according to claim 3, wherein the core materials are formed by a punching process of metallic plate materials, and the ironing process is performed in a same direction as a punching direction of the punching process.

5. The rotating electric machine according to claim 2, wherein the core materials are formed by a punching process of metallic plate materials, and the ironing process is performed in a same direction as a punching direction of the punching process.

6. The rotating electric machine according to claim 1, wherein the core includes a space passing therethrough in an axial direction at an inner radial-side part of the core that defines the shaft hole with the space located at an inner radial side further than a location where the core materials are integrated.

7. The rotating electric machine according to claim 6, wherein the core materials are formed by a punching process of metallic plate materials, and the ironing process is performed in a same direction as a punching direction of the punching process.

8. The rotating electric machine according to claim 1, wherein the core materials are formed by a punching process of metallic plate materials, and the ironing process is performed in a same direction as a punching direction of the punching process.

9. A manufacturing method of an armature, comprising:
   forming a core that includes a shaft hole by laminating a plurality of core materials; and
   applying an ironing process to the shaft hole in order to rectify a cylindrical hole shape of the shaft hole.

10. A manufacturing method of a rotating electric machine, comprising:
    forming the armature according to claim 9; and
    pressing in an fixing a shaft to the shaft hole after forming the armature.

11. The method according to claim 10, wherein a part of the shaft, whose outer circumferential surface is fitted with the shaft hole, is formed in a perfect circular shape.

12. The method according to claim 11, wherein the core includes a space passing therethrough in an axial direction at an inner radial-side part of the core that defines the shaft hole with the space located at an inner radial side further than a location where the core materials are integrated.

13. The method according to claim 12, wherein the core materials are formed by a punching process of metallic plate materials, and the ironing process is performed in a same direction as a punching direction of the punching process.

14. The method according to claim 11, wherein the core materials are formed by a punching process of metallic plate materials, and the ironing process is performed in a same direction as a punching direction of the punching process.

15. The method according to claim 9, wherein the core includes a space passing therethrough in an axial direction at an inner radial-side part of the core that defines the shaft hole with the space located at an inner radial side further than a location where the core materials are integrated.

16. The method according to claim 15, wherein the core materials are formed by a punching process of metallic plate materials, and the ironing process is performed in a same direction as a punching direction of the punching process.

17. The method according to claim 9, wherein the core materials are formed by a punching process of metallic plate materials, and the ironing process is performed in a same direction as a punching direction of the punching process.

18. An armature, comprising:
a core that includes a shaft hole, wherein:
the core includes a plurality of core materials that are laminated, the plurality of core materials forming the shaft hole, and
the shaft hole is applied with an ironing process in order to rectify a cylindrical hole shape of the shaft hole such that the shaft hole is formed without steps and lamination misalignment in the lamination of the plurality of core materials is eliminated.

19. The armature according to claim 18, wherein the core includes a space passing therethrough in an axial direction at an inner radial-side part of the core that defines the shaft hole with the space located at an inner radial side further than a location where the core materials are integrated.

20. The armature according to claim 18, wherein the core materials are formed by a punching process of metallic plate materials, and the ironing process is performed in a same direction as a punching direction of the punching process.

* * * * *